United States Patent
Bokelman

(10) Patent No.: US 6,241,237 B1
(45) Date of Patent: Jun. 5, 2001

(54) AUTOMATIC DOCUMENT FEEDING METHOD AND APPARATUS AND DUPLEXING DOCUMENT SCANNING DEVICE USING SAME

(75) Inventor: Kevin Bokelman, La Jolla, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/405,991

(22) Filed: Sep. 27, 1999

(51) Int. Cl.$^7$ ........................................................ B65H 3/44
(52) U.S. Cl. .................... 271/9.11; 221/9.13; 221/9.14; 221/114; 221/122; 358/498
(58) Field of Search ................... 271/9.07, 9.11, 271/9.13, 114, 122, 126, 145; 400/629; 358/498

(56) References Cited

U.S. PATENT DOCUMENTS

| | | |
|---|---|---|
| 4,184,671 | 1/1980 | Sasamori . |
| 4,348,019 * | 9/1982 | Stievenart et al. ................. 271/10 X |
| 4,384,782 | 5/1983 | Acquaviva . |
| 4,515,358 * | 5/1985 | Fukui ................................. 271/122 |
| 4,632,376 | 12/1986 | DuBois . |
| 4,674,734 | 6/1987 | Ibuchi . |
| 4,879,578 * | 11/1989 | Hisajima et al. .................... 355/234 |
| 5,022,640 | 6/1991 | Greco . |
| 5,116,034 * | 5/1992 | Trask et al. ........................ 271/2 X |
| 5,219,156 * | 6/1993 | Mori ................................. 271/110 X |
| 5,887,867 * | 2/1999 | Takahashi et al. ................ 271/117 X |

* cited by examiner

Primary Examiner—Christopher P. Ellis
Assistant Examiner—Kenneth W Bower

(57) ABSTRACT

A method and apparatus for picking the top or the bottom sheet, as desired from a stack of sheets of documents to be scanned using opposed rollers or other members which apply differing amounts of frictional force to opposite faces of the sheet to be picked. The opposed rollers each have substantially the same coefficient of friction and are selectively rotated each in the same direction of rotation but with different torques to apply differential frictional forces to pick the desired sheet from the top or the bottom of the stack.

24 Claims, 4 Drawing Sheets

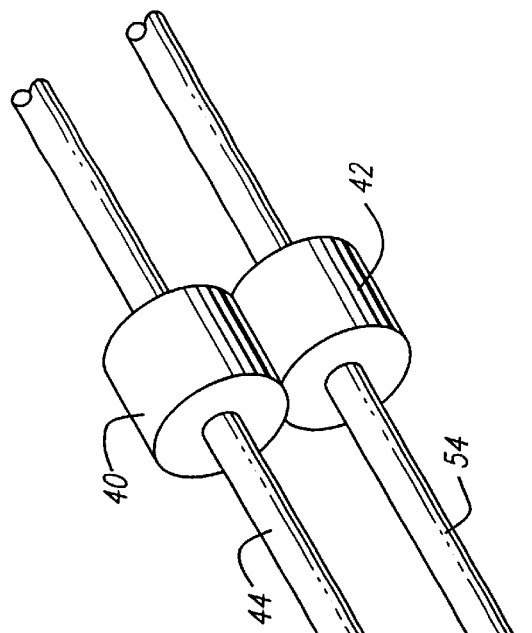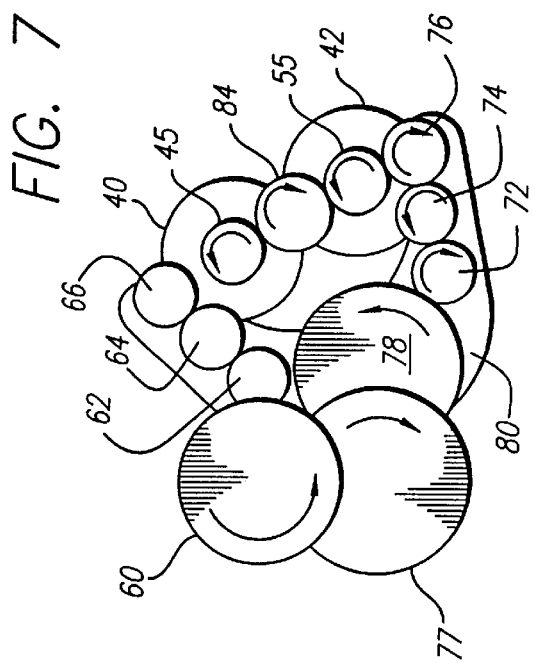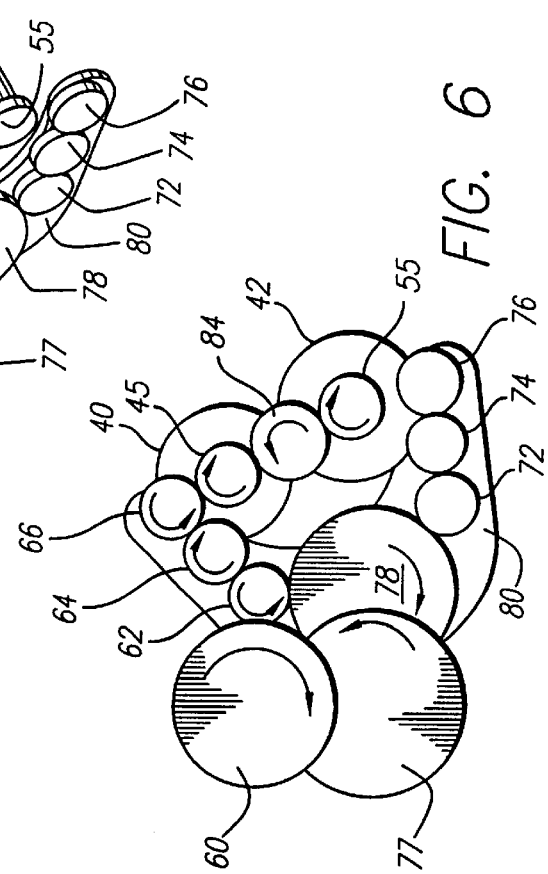

AUTOMATIC DOCUMENT FEEDING METHOD AND APPARATUS AND DUPLEXING DOCUMENT SCANNING DEVICE USING SAME

CROSS REFERENCE TO RELATED APPLICATIONS IF ANY

None.

BACKGROUND OF THE INVENTION AND PRIOR ART

The present invention relates to a method and apparatus for picking the top or the bottom sheet, as desired, from a stack of sheet documents to be scanned in a document scanning device such as an all in one document scanner, copier and facsimile machine or for stand alone scanners, copiers and facsimile machines and the like. As used herein, the term "document scanning device" is therefore intended to encompass all types of devices in which documents are fed to be scanned and the teachings of this disclosure are accordingly not necessarily limited to all in one or stand alone document scanners, copiers and facsimile machines.

Automatic document feeders, particularly for all in one products such as generally described above, require a mechanism which must pick in the correct order of document sheets which are stacked. For facsimile transmission of a multi-page document, the first page picked by the automatic document feeder should be transmitted first to in accordance with conventional first page out facsimile transmission protocol. Conversely, when copying a document, it is conventional to pick and copy the last sheet of the document first in order to assure that the printed output order is correct. This problem is resolved if the user is willing to insert the input documents in one order, e.g., face down for facsimile transmission and in a different order, e.g., face up for simplex (one side) sheet copying. For truly universal operation of an all in one product, not only single sided (simplex) copying, facsimile transmission and scanning should be achievable by the automatic document feeder, but also double sided (duplex) copying, facsimile transmission and document scanning should be achievable without the user being required to stack the document differently depending on the function to be performed.

The present invention is directed to an automatic document feeder which has the capability of picking single document sheets to be scanned with the same mechanism which can be easily controlled to either pick from the top or the bottom of the document stack depending on the function to be achieved and without changing the position of the mechanism on the scanning device.

SUMMARY OF THE INVENTION

In its method aspects, the present invention provides a method of moving a document to be transported to a scan region of a document scanning device from a document stack comprising the steps of:
a) picking a single sheet of document from a surface of a stack of sheets of documents by contacting opposite face sides of said sheet with opposed moveable members which apply differing amounts of frictional force to opposite face sides of said sheet;
b) rotating a first one of said moveable members with a first torque to apply a first frictional force to the surface of said sheet facing outwardly of said stack; and
c) rotating a second one of said moveable members with a second torque to apply a second frictional force to the surface of said sheet which faces said stack, said first torque and force being higher than said second torque and force.

In its broadest apparatus aspects, the present invention provides apparatus for feeding documents to be scanned to a document scanning device comprising:
a) a support for a stack of documents to be fed to said scanning device;
b) a pair of opposed rotary members comprising a sheet pick member and a sheet retard member for contacting opposite face sides of a single sheet of document and applying frictional force thereto; and
c) a drive mechanism for rotating said members in the same forward direction of rotation for uppermost sheet picking and in the same reverse direction of rotation for lowermost sheet picking such that an upper one of said members applies more torque and frictional force than a lower one of said members when picking an uppermost sheet from said stack and said lower one of said members applies more torque and frictional force than said upper one of said members when picking a lowermost sheet from said stack.

Additionally, the present invention further provides a document scanning device comprising:
a) a support for a stack of documents to be scanned;
b) spaced guides defining a path of document travel extending from said support through a scanning region past a document scanner to a scanned document output location;
c) a document drive apparatus for moving documents to be scanned along said path through said scanning region to said scanned document output location;
d) a pair of opposed document contact rollers for picking individual sheets of documents to be scanned from a stack of documents on said support, said rollers comprising a pick roller and a retard roller; and
e) a drive mechanism for moving said rollers in the same forward direction of rotation for uppermost sheet picking and in the same reverse direction of rotation for lowermost sheet picking such that an upper one of said rollers applies more torque than a lower one of said rollers when picking an uppermost sheet from said stack and said lower one of said rollers applies more torque than said upper one of said rollers when picking a lowermost sheet from said stack for moving said sheet to be scanned to said path of media travel.

BRIEF DESCRIPTION OF THE DRAWINGS

FIG. 5 is a schematic perspective view of a second form of pick roller drive mechanism for use in the present invention.

FIG. 6 is a side elevation view of the roller drive of FIG. 5 showing roller movement during a top sheet pick operation.

FIG. 7 is a side elevation view of the roller drive of FIG. 5 showing roller movement during a bottom sheet pick operation.

DESCRIPTION OF THE PREFERRED EMBODIMENT

Figure 1:
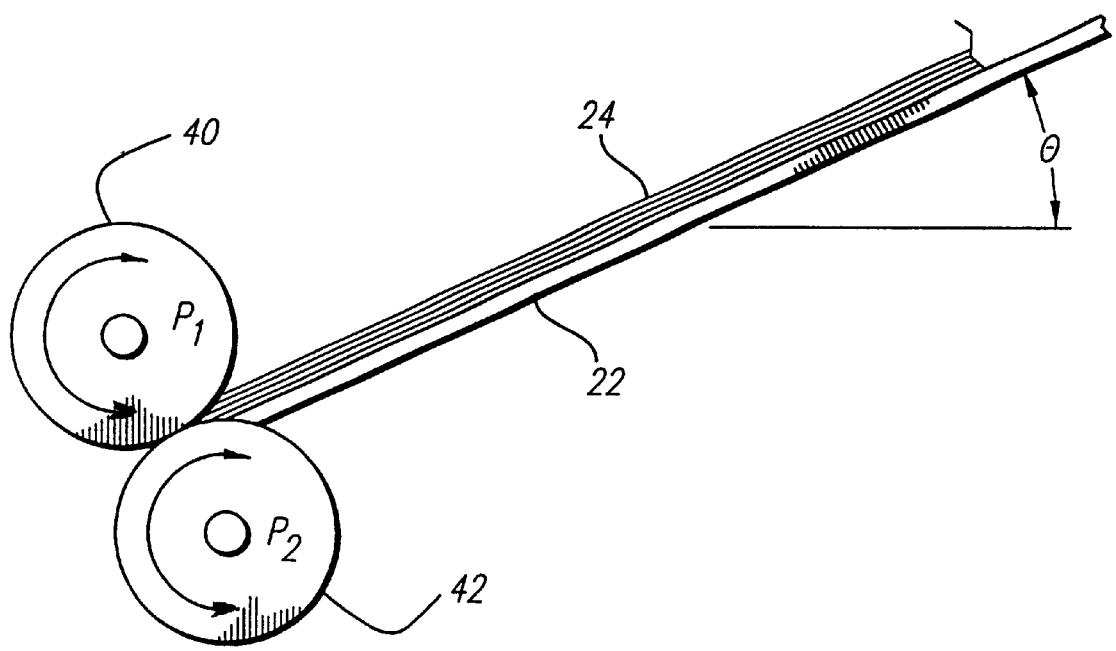
FIG. 1 is a schematic side elevation view of an inclined media stack and picking rollers capable of repeatedly picking single sheets of media from either the top or from the bottom of the media stack and showing the mode of operation for picking the top sheet of media from the stack.
Figure 2:
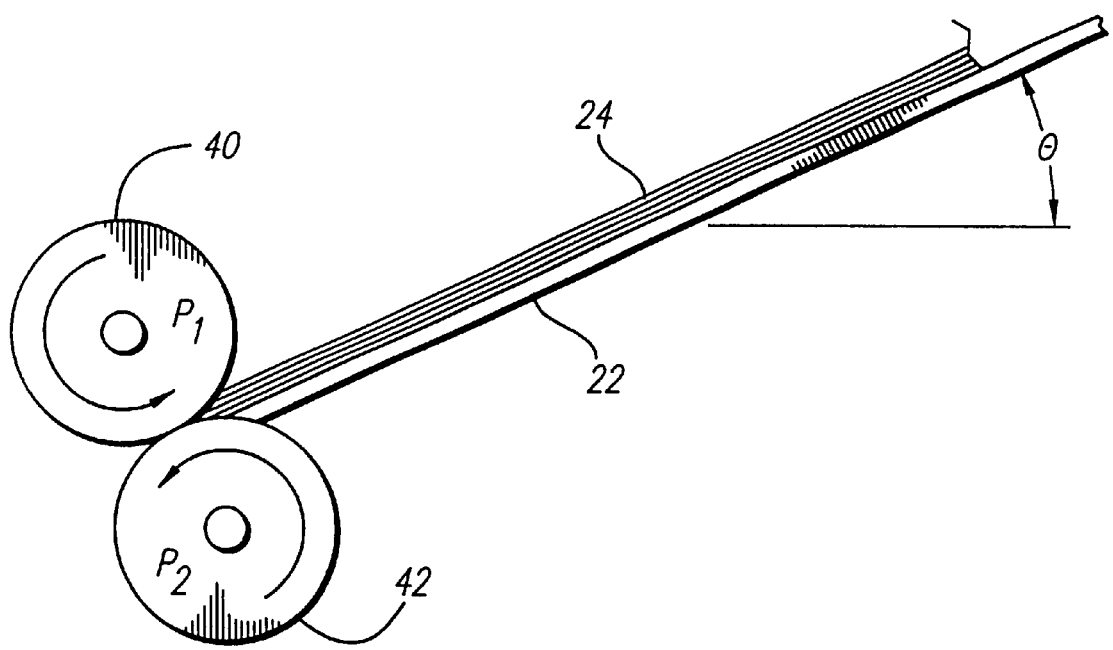
FIG. 2 is a schematic side elevation view like FIG. 1 but showing the mode of operation for picking the bottom sheet of media from the stack.

As seen in FIGS. 1 and 2 which respectively show in schematic form the operation of media pick rollers for picking the top or uppermost one of a stack of sheets of media to be scanned and, in FIG. 2 for picking the lowermost or bottom sheet from the stack, a media feed and support tray 22 is inclined at an angle θ from the horizontal between 0° and 90°, preferably in the range from 15° to 30° such that gravity assists in feeding the stack of media to opposed upper and lower sheet pick rollers 40, 42. It will be understood that although single rollers are shown in the schematic drawings, these rollers may comprise a series of spaced rollers on a common shaft. The uppermost sheet of media from the stack 24 is picked, as shown in FIG. 1, by rotating the upper sheet pick roller 40 in the clockwise direction while rotating the lower roller 42, also in the clockwise direction, to function as a retard roller for retarding movement of all but the uppermost sheet of media from the stack through the bight between the rollers 40, 42. As is known, the sheet pick rollers 40, 42 may be provided with a rubberized or other suitable non-slip surface for gripping the surface of a sheet of paper or other media to be fed to a scan region of a document scanning device. Preferably, the coefficient of friction of the media engaging surfaces of the rollers 40, 42 is substantially the same so that by reversing the direction of rotation of the rollers, either one of the rollers may act as a pick roller while the other acts as a retard roller. Picking of the upper sheet single sheet of paper or other media is accomplished in novel fashion according to the invention by rotating the upper roller 40 with a greater amount of torque than the amount of torque applied to the bottom roller 42 as both rotate in the clockwise direction.

As seen in FIG. 2, when the lowermost or bottom sheet of paper or other media is to be picked from the stack, the direction of rotation of the rollers 40, 42 is reversed such that both rotate in the counterclockwise direction as shown with application of a higher torque to the lower pick roller 42 than the amount of torque applied to the upper pick roller 40. When picking the lowermost sheet from the stack, the upper roller 40 operates as a retard roller.

Figure 3:
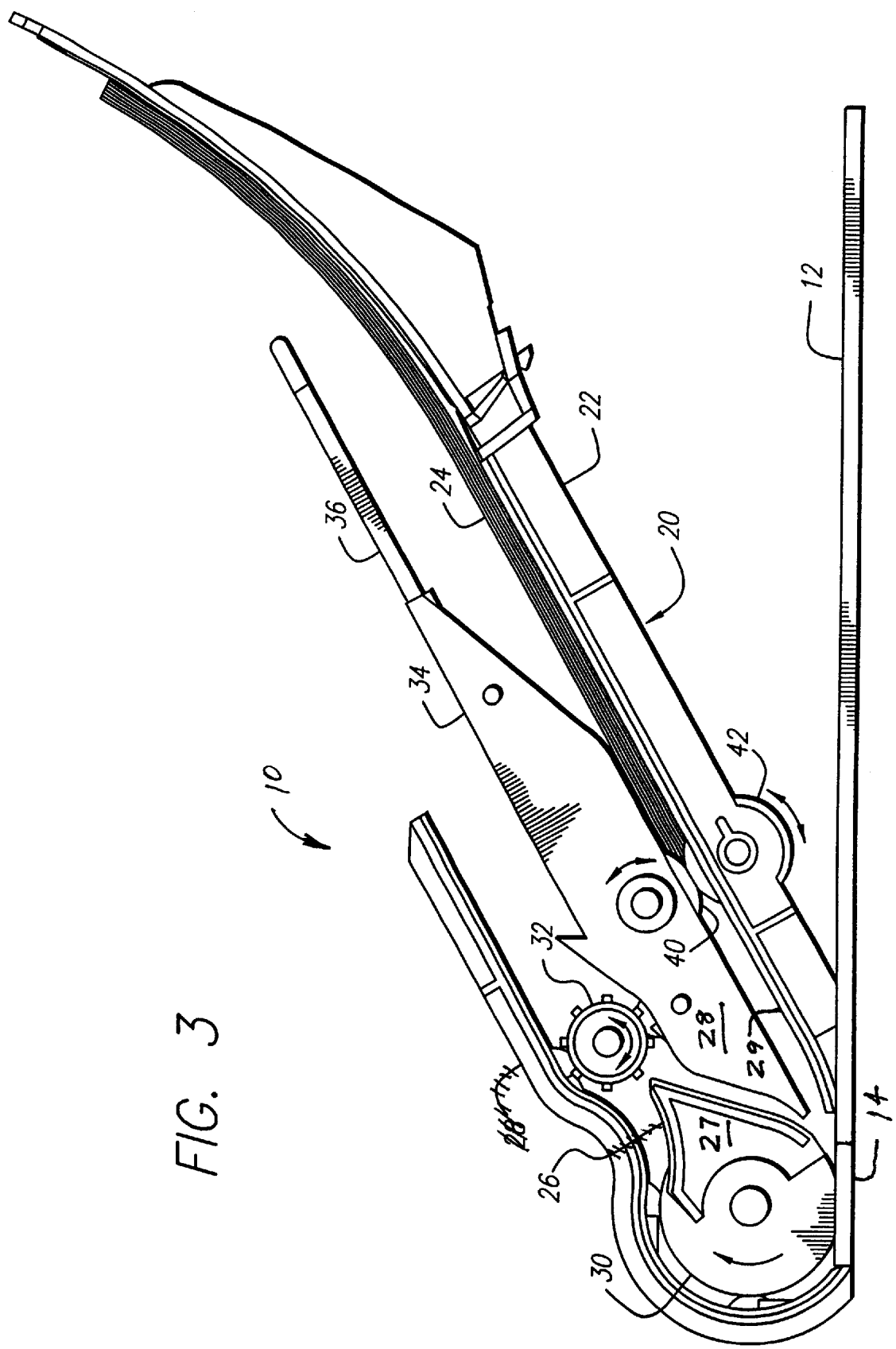
FIG. 3 is a side elevation view of a sheet picking apparatus embodying the invention.

FIG. 3 is a schematic side elevation view of a document scanning device 10 having a generally flat horizontally extending table or platen surface 12 having a window 14 at one end thereof through which a document to be scanned can be viewed by the scanning components of the device as is conventional. The device has an inclined frame 20 on which a document input or feed tray 22 for holding a stack 24 of documents to be fed to the scanning device is provided. A plurality of paper guides 26, 27, 28, 29 are suitably supported on the frame 20 and define a paper path extending from the media stack 24 to the scan region 14 and thence past a document drive roller 30 and document output roller 32 to a scanned document output location at which a tray 34 is preferably provided for receiving a stack 36 of scanned documents. The apparatus for feeding individual sheets from the stack 24 to the scan region 14 includes the media support or feed tray 22 as well as the upper and lower media pick rollers 40, 42 and a suitable drive mechanism for moving the rollers 40, 42 in the same forward direction of rotation (e.g., clockwise) for uppermost sheet picking and in the same reverse direction (e.g., counterclockwise) for lowermost sheet picking. The rollers 40, 42 must be driven in a manner such that the amount of torque and resulting frictional force applied to the surface of a sheet which faces outwardly of the stack is greater than the amount of torque applied to the roller and resulting frictional force applied to the side of the sheet to be picked which faces the stack.

Figure 4:
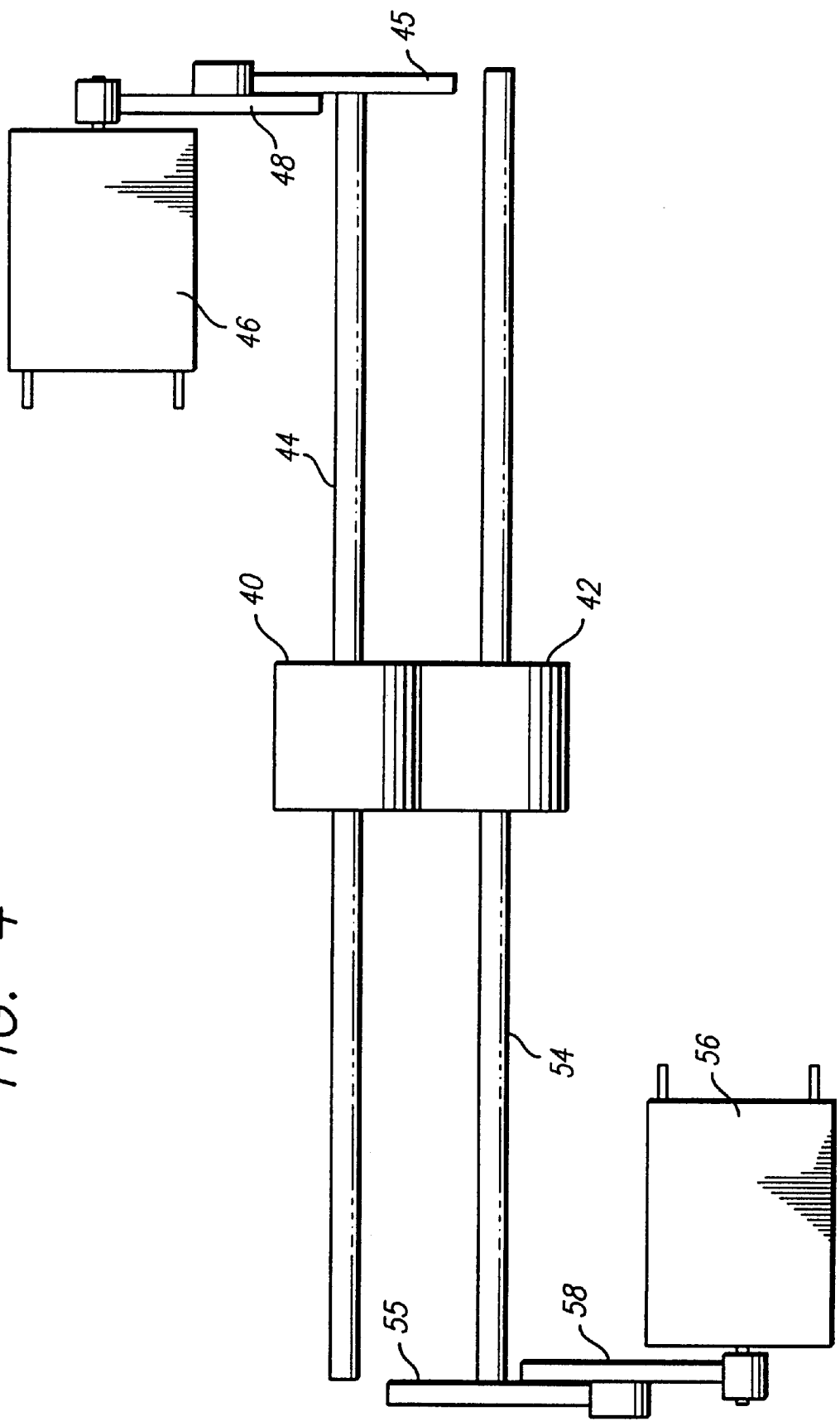
FIG. 4 is a schematic front elevation view of one form of pick roller drive mechanism for use in the present invention.

The drive mechanism for rotating the rollers 40, 42 can take any one of various forms. One form of drive mechanism is schematically shown in FIG. 4 and employs a small DC motor 46 and transmission 48 to drive shaft 44 on which the top pick roller 40 is mounted via gear 45. Similarly, a second small DC motor 56 is used to drive the bottom pick roller 42 which is mounted on shaft 54 through a transmission 58. The motors are operated such that the transmissions 45, 48 drive the rollers 40, 42 such that the torque and frictional force applied to the document sheet by the retarding roller is significantly less than that of the picking roller.

A second form of roller drive is schematically shown in FIGS. 5–7. In this arrangement, a single small DC motor 60 simultaneously provides rotary power to both the upper roller 40 and lower roller 42. A plurality of upper roller drive gears 62, 64, 66 and lower roller drive gears 72, 74, 76 are all mounted on a pivoting shift plate 80 which pivotally moves to a first or lower (clockwise) position as seen in FIG. 6 when drive motor 60 is rotated in the clockwise direction such that the upper drive gears 62, 64, 66 engage gear 45 to drive the upper shaft 44 and top pick roller 40 while torque limiting gear 84 simultaneously engages and drives the lower shaft 54 via gear 55 to rotate the bottom pick roller 42 at a lower torque when picking the top sheet of media from the stack.

FIG. 7 shows the reverse operation for picking the lowermost sheet of media from the stack. In this arrangement, the motor 60 rotates in the reverse (counterclockwise as shown) direction to pivot the shift plate 80 from the position seen in FIG. 6 counterclockwise to the position shown in FIG. 7 such that lower shaft drive gears 72, 74, 76 directly engage the gear 55 and shaft 54 to power rotate the lower roller 42. In this position of the transmission, the upper drive gears 62, 64, 66 are disengaged from the gear 45 while rotary power is transmitted to the upper shaft 44 via gear 45 through the torque limiting gear 84. With the mechanisms thus far described, the device can pick and scan according to the following table. Simplex and Duplex faxing are exactly the same as simplex and Duplex copying.

| | Simplex Copy | Duplex Copy | Simplex Fax | Duplex Fax |
|---|---|---|---|---|
| ADF Input Stack Order | $\frac{N}{1}$ | $\frac{N}{1}$ | $\frac{N}{1}$ | $\frac{N}{1}$ |
| Pick Order | N ▶ 1 | 1 ▶ N | 1 ▶ N | 1 ▶ N |
| ADF Output Order | $\frac{1}{N}$ | $\frac{N}{1}$ | $\frac{N}{1}$ | $\frac{N}{1}$ |
| Print Output Order | $\frac{1}{N}$ | $\frac{N}{1}$ | N/A | N/A |

Note:
1/N designates the stack with first page on top, $N^{th}$ page on bottom, facing up.
N/1 designates the stack with the $N^{th}$ page on top, first page on bottom, facing down.
Simplex Fax ADF Output Order is maintained by duplexing the document once.

It will be seen that the user never has to change the orientation of the input documents and that the order of the original document stack is always maintained at the scanned document output tray 34. Additionally, printed copies are delivered when desired in the correct order in which the document pages were scanned. Thus, without user intervention other than by telling the device whether to copy or transmit a facsimile of the scanned document, the disclosed mechanism can selectively pick from the top or bottom of the input document stack to maintain first page output order in all cases of copying, scanning and facsimile transmission.

Persons skilled in the art will appreciate that various modifications can be made in the preferred embodiments shown and described above and that the scope of protection is limited only by the wording of the claims which follow. For example, the rollers 40, 42 may instead be replaced by belts and the different drive arrangements shown in FIGS. 4–7 can easily be replaced by other roller drives so long as the proper amount of torque is applied to the opposed rollers 40, 42 to maintain a torque differential therebetween adequate to prevent misfeed of multiple document sheets as described.

What is claimed is:

1. A method of moving a document to be transported to a scan region of a document scanning device from a document stack comprising the steps of:
   a) picking a single sheet of document from a surface of a stack of sheets of documents by contacting opposite face sides of said sheet with opposed moveable members which apply differing amounts of frictional force to opposite face sides of said sheet;
   b) rotating a first one of said moveable members with a first torque to apply a first frictional force to the surface of said sheet facing outwardly of said stack; and
   c) rotating a second one of said moveable members with a second torque to apply a second frictional force to the surface of said sheet which faces said stack, said first torque and force being higher than said second torque and force.

2. The method of claim 1, wherein said sheet to be picked is the uppermost one of a stack of sheets which is inclined from horizontal, said moveable members comprising an upper roller and a lower roller each having substantially the same coefficient of surface friction, and rotating said lower roller with less torque than said upper roller to apply less frictional sheet picking force to the sheet with the lower roller than with said upper roller.

3. The method of claim 2, comprising the step of:
   d) picking said sheet while rotating said upper and lower rotatable rollers in the same direction of rotation.

4. The method of claim 3, including duplex scanning of said sheet by:
   e) moving said sheet in a first direction through a scan region to scan the bottom side of said sheet;
   f) ejecting said sheet from said scan region upside down;
   g) again moving said sheet in said first direction through said scan region to scan the top side of said sheet; and
   h) ejecting said sheet from said scan region top side up.

5. The method of claim 4, including repeating steps a) through h) to duplex scan successive sheets in said stack.

6. The method of claim 1, wherein said sheet to be picked is the lowermost one of a stack of sheets which is inclined from horizontal, said rotatable members comprising an upper rotatable member and a lower rotatable member having substantially the same coefficient of surface friction, and applying greater sheet picking frictional force to the sheet with the upper member than with said lower rotatable member.

7. The method of claim 6, comprising the step of:
   d) picking said sheet while rotating said upper and lower rotatable members in the same direction of rotation.

8. The method of claim 7, including duplex scanning said sheet by:
   e) moving said sheet in a first direction through a scan region to scan the bottom side of said sheet;
   f) ejecting said sheet from said scan region upside down;
   g) again moving said sheet in said first direction through said scan region to scan the top side of said sheet; and
   h) ejecting said sheet from said scan region top side up.

9. The method of claim 8, including repeating steps a) through h) to duplex scan successive sheets in said stack.

10. Apparatus for feeding documents to be scanned to a document scanning device comprising:
    a) a support for a stack of documents to be fed to said scanning device;
    b) a pair of opposed rotary members comprising a sheet pick member and a sheet retard member for contacting opposite face sides of a single sheet of document and applying frictional force thereto; and
    c) a drive mechanism for rotating said members in the same forward direction of rotation for uppermost sheet picking and in the same reverse direction of rotation for lowermost sheet picking such that an upper one of said members applies more torque and frictional force than a lower one of said members when picking an uppermost sheet from said stack and said lower one of said members applies more torque and frictional force than said upper one of said members when picking a lowermost sheet from said stack.

11. The apparatus of claim 10, wherein said document contact rollers have substantially the same coefficient of surface friction.

12. The apparatus of claim 10, wherein said rotatable members are rollers each having a surface for contacting said opposite face sides of said sheet.

13. The apparatus of claim 12, wherein said drive mechanism comprises a first motor and transmission for rotating said upper one of said rollers and a second motor and transmission for rotating said lower one of said rollers.

14. The apparatus of claim 12, wherein said drive mechanism comprises a single motor for simultaneously rotating said upper roller and said lower roller, and a transmission for transmitting power from said motor to drive one of said rollers during rotation of said motor in a first direction while limiting torque to the other one of said rollers and for driving the other one of said rollers during rotation of said motor in a second direction while limiting torque to said first one of said rollers.

15. The apparatus of claim 12, wherein said support for a stack of media to be fed is inclined from the horizontal at an angle θ in the range of from 15° to 30°.

16. The apparatus of claim 15, wherein said media contact rollers have substantially the same coefficient of surface friction.

17. A document scanning device comprising:
    a) a support for a stack of documents to be scanned;
    b) spaced guides defining a path of document travel extending from said support through a scanning region past a document scanner to a scanned document output location;
    c) a document drive apparatus for moving documents to be scanned along said path through said scanning region to said scanned document output location;

d) a pair of opposed document contact rollers for picking individual sheets of documents to be scanned from a stack of documents on said support, said rollers comprising a pick roller and a retard roller; and e) a drive mechanism for moving said rollers in the same forward direction of rotation for uppermost sheet picking and in the same reverse direction of rotation for lowermost sheet picking such that an upper one of said rollers applies more torque than a lower one of said rollers when picking an uppermost sheet from said stack and said lower one of said rollers applies more torque than said upper one of said rollers when picking a lowermost sheet from said stack for moving said sheet to be scanned to said path of media travel.

18. The apparatus of claim 17, wherein said drive mechanism comprises a first motor and transmission for rotating said upper one of said rollers and a second motor and transmission for rotating said lower one of said rollers.

19. The apparatus of claim 17, wherein said drive mechanism comprises a single motor for simultaneously rotating said upper roller and said lower roller, and a transmission for transmitting power from said motor to drive one of said rollers during rotation of said motor in a first direction while limiting torque to the other one of said rollers and for driving the other one of said rollers during rotation of said motor in a second direction while limiting torque to said first one of said rollers.

20. The apparatus of claim 17, wherein said support for a stack of documents to be fed is inclined from the horizontal at an angle θ in the range of from 15° to 30°.

21. The apparatus of claim 17, wherein said document path extends downwardly from said contact rollers to said scanning region and thence upwardly to said document output location and further comprising an inclined scanned document output support at said output location for receiving said scanned sheets of documents.

22. The apparatus of claim 21, further comprising a scanned document sheet input path defined by said guides, said scanned document sheet input path extending from said output location downwardly to said scanning region.

23. The apparatus of claim 22, further comprising a scanned document drive roller for moving scanned document sheets from said scanning region to said output location and from said output location to said scanning region and means for rotating said scanned document roller in opposite directions to move said scanned sheets of documents in opposite directions.

24. The apparatus of claim 23, further comprising a scanned document output tray at said output location, said output tray being above said support for said stack of documents to be scanned.

\* \* \* \* \*